(12) United States Patent
Brown

(10) Patent No.: US 7,845,312 B2
(45) Date of Patent: Dec. 7, 2010

(54) ANIMAL RESTRAINT

(76) Inventor: Martin C. Brown, N91 W27221 Hickory Rd., Hartland, WI (US) 53029

( * ) Notice: Subject to any disclaimer, the term of this patent is extended or adjusted under 35 U.S.C. 154(b) by 194 days.

(21) Appl. No.: 12/220,267

(22) Filed: Jul. 23, 2008

(65) Prior Publication Data
US 2010/0018473 A1 Jan. 28, 2010

(51) Int. Cl.
*A01K 27/00* (2006.01)
(52) U.S. Cl. .................................................. 119/784
(58) Field of Classification Search ............. 119/702, 119/703, 704, 784, 785, 786, 787, 788, 795, 119/808; 52/182, 184, 831, 832, 833; 105/141, 105/154; 472/85, 867
See application file for complete search history.

(56) References Cited

U.S. PATENT DOCUMENTS

| | | | |
|---|---|---|---|
| 1,525,713 A | | 2/1925 | Baughman |
| 2,721,521 A | * | 10/1955 | Mitchell ........................ 104/48 |
| 2,953,116 A | | 9/1960 | Lund |
| 3,189,003 A | * | 6/1965 | Canfield ....................... 119/784 |
| 3,203,360 A | * | 8/1965 | Renfroe et al. ............... 105/154 |
| 3,203,399 A | | 8/1965 | Banks |
| 3,678,903 A | | 7/1972 | Ferraro |
| 3,814,023 A | * | 6/1974 | Stantial ......................... 104/94 |
| 3,983,845 A | | 10/1976 | Roehrig |
| 4,094,252 A | * | 6/1978 | Pater et al. ............... 104/130.01 |
| 4,130,177 A | * | 12/1978 | Pandolph ....................... 182/8 |
| 4,161,924 A | | 7/1979 | Welker |
| 4,232,630 A | * | 11/1980 | Orlowski et al. ............ 119/703 |
| 4,619,222 A | | 10/1986 | Sundberg et al. |
| 4,791,886 A | | 12/1988 | Anderson |
| 4,862,833 A | | 9/1989 | Brotz |
| 5,213,063 A | | 5/1993 | Franck, III |
| 5,339,773 A | | 8/1994 | Van Druff |
| 5,437,246 A | | 8/1995 | Noles |
| 5,443,038 A | | 8/1995 | Marino |
| 5,746,157 A | | 5/1998 | Warwaruk |
| 6,113,275 A | | 9/2000 | Blase |
| 6,412,444 B1 | | 7/2002 | Esham |
| 6,701,873 B2 | | 3/2004 | Fradette, II |
| 6,886,498 B1 | | 5/2005 | Rochette |
| 7,040,255 B1 | | 5/2006 | Anderson |
| 2004/0144284 A1 | * | 7/2004 | Lai .............................. 105/141 |

OTHER PUBLICATIONS

Drylin Catalog, igus Inc., date unknown.

* cited by examiner

*Primary Examiner*—Rob Swiatek
*Assistant Examiner*—Ebony Evans
(74) *Attorney, Agent, or Firm*—Ryan Kromholz & Manion, S.C.

(57) ABSTRACT

An animal restraint apparatus according to the present invention includes a longitudinal rail and a trolley adapted to be slidably disposed on the rail. The trolley provides a leash hitch to which an animal may be coupled. An animal restraint system according to the present invention includes a longitudinal rail, which may include a plurality of joined rail sections, mounted to a support structure and a trolley slidably disposed on the rail. A method according to the present invention of restraining animals includes the steps of providing a longitudinal rail and a trolley slidably disposed on the rail, anchoring the rail to a support structure, and coupling an animal to the trolley, thereby allowing the animal to roam within a predetermined envelope of movement.

4 Claims, 9 Drawing Sheets

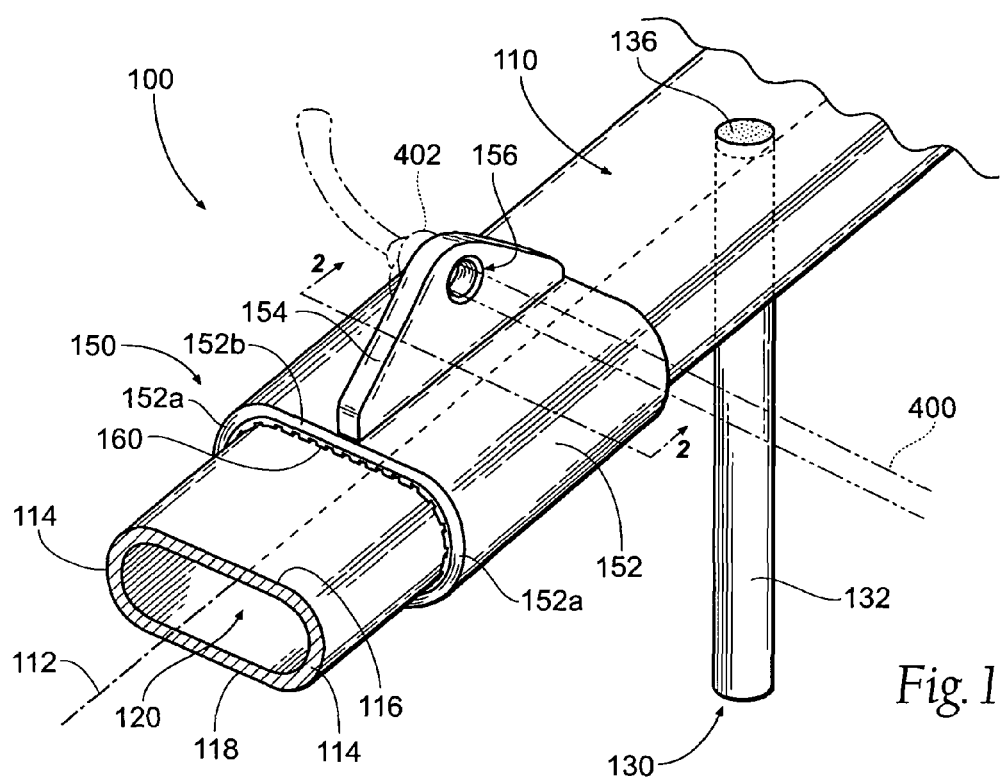
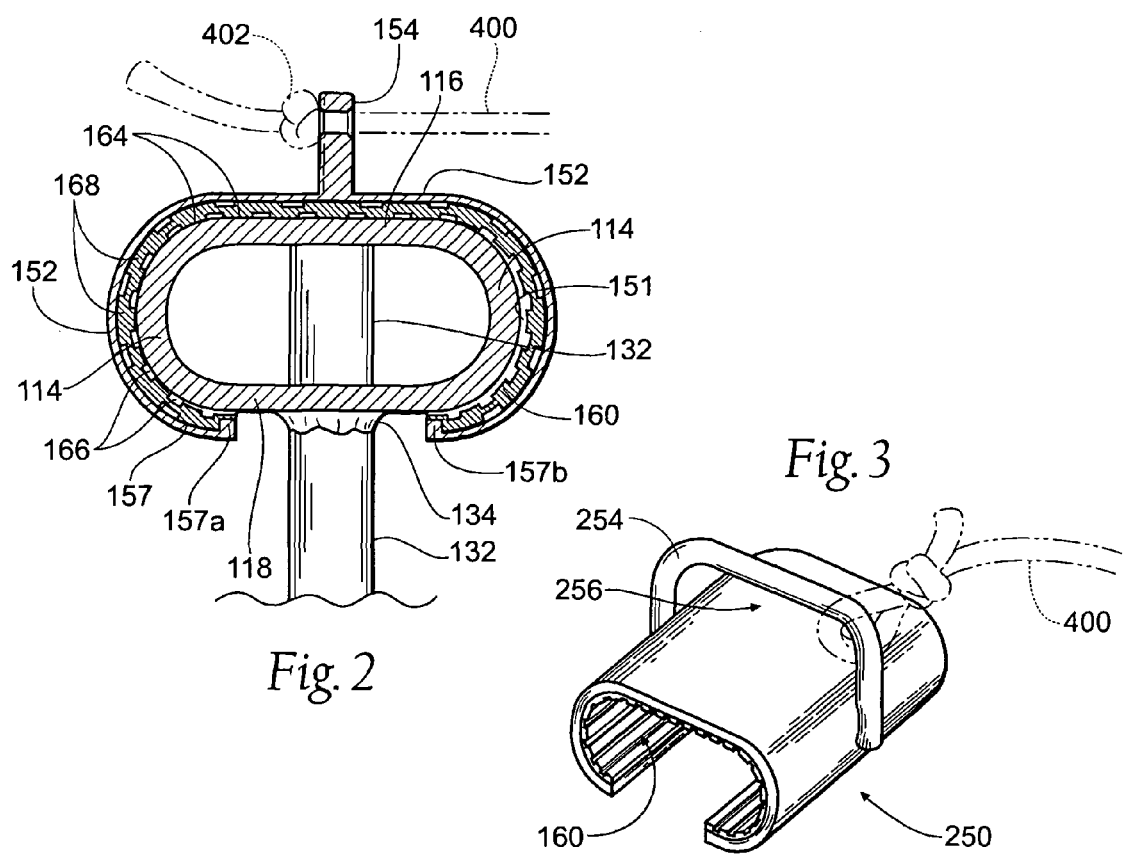
Fig. 1
Fig. 2
Fig. 3

ANIMAL RESTRAINT

BACKGROUND OF THE INVENTION

An apparatus, system or method according to the present invention relates generally to animal control, and more specifically to an animal restraint apparatus, system and method.

Prior apparatus have been developed for the restraint of animals. From the basic handheld leash to elaborate cages, a majority of these prior apparatus have utility in their intended function. For instance, prior apparatus include an elevated flexible cord that allows an animal some longitudinal movement. Such apparatus, however, generally includes unsightly cord support poles, and the cord itself may hamper with enjoyment of the space by others. Other apparatus include longitudinal tracks that are susceptible to debris accumulation.

Therefore, while prior apparatus have been developed for the restraint of animals, there is still room for improvement in the art.

SUMMARY OF THE INVENTION

An apparatus according to the present invention includes a rail formed about, and in a length along, a longitudinal axis. The rail has a rail bottom wall and a rail top wall opposed from said rail bottom wall. The bottom wall and top wall are formed along at least a portion of the rail length, and both may be substantially planar. The apparatus further includes a trolley that is longitudinally slidable along the rail. The trolley includes a trolley carriage disposed at least partially around the rail and a leash hitch. Coupled to and adapted to support the rail is at least one rail support member, such as a support strut that may extend away from the bottom surface of the rail. In operative connection with the rail is a trolley stop adapted to prevent longitudinally sliding movement of the trolley in a first direction along said rail.

According to another aspect of an apparatus according to the present invention, the rail may further include a pair of semiannular sidewalls diametrically opposed along the longitudinal axis of the rail, the semiannular sidewalls coupling the top wall and the bottom wall.

According to yet another aspect of an apparatus according to the present invention, the trolley carriage may include a pair of semiannular carriage sidewalls diametrically opposed along the longitudinal axis of the rail and a generally planar carriage top wall coupling the carriage sidewalls in a spaced apart relationship. The carriage sidewalls and carriage top wall may extend along a carriage length.

According to still another aspect of an apparatus according to the present invention, the leash hitch may include a plate member, including a leash aperture formed therethrough, immovably coupled to the trolley carriage.

According to a further aspect of an apparatus according to the present invention, the trolley may include a trolley carriage provided along a trolley length, and a leash hitch coupled to the trolley carriage. An inner surface of the trolley carriage may surround a majority of the rail, including the top surface of the rail, along the trolley length. Additionally, the trolley may include a slide bearing disposed between at least a portion of the trolley carriage inner surface and a portion of the rail. The slide bearing may include a bearing body having a first surface and a second surface. Disposed on the first surface is a plurality of ridges that may be at least substantially parallel to the longitudinal axis of the rail. Disposed on the second surface of the bearing body may be at least one retaining tab, at least one of which extends into a groove formed in the trolley carriage inner surface. The bearing may be provided along a bearing length, which is equal to or less than the trolley length.

According to a still further aspect of an apparatus according to the present invention, at least one trolley stop may be remotely selectively activated.

An animal restraint system according to the present invention includes a first rail system and a second rail system, each rail system including a rail formed about, and in a rail length along, a longitudinal axis. The rail has a rail bottom wall and a rail top wall opposed from the rail bottom wall. The rail bottom wall and the rail top wall formed along at least a portion of the rail length. Each system also includes a trolley longitudinally slidable along the rail. The trolley includes a trolley carriage disposed at least partially around the rail, and a leash hitch. At least one rail support member is coupled to and adapted to support the rail. At least one trolley stop is in operative connection with the rail. The trolley stop is adapted to prevent longitudinally sliding movement of the trolley in a first direction along the rail. Each rail of each rail system is then anchored to a support structure, which may be a single support structure for anchoring both rails.

According to another aspect of a system according to the present invention, one rail support member may include a first support strut coupled to a first end of an anchor sleeve. Another rail support member, coupled to the second rail, may include a second support strut coupled to a second end of the anchor sleeve. A single support structure for anchoring both rails may include a plurality of cylindrical steel fence posts situated generally orthogonal to a horizontal surface, such as the ground.

According to still another aspect of a system according to the present invention, a rail may include a first curve along at least a portion of the rail length. The curve may have a radius that is at least a predetermined minimum radius. A trolley carriage may have an inner surface disposed substantially concentrically around a rail along a trolley length. The inner surface is laterally displaceable from the rail by a first clearance distance. The predetermined minimum radius may be about the sum of one half of the clearance distance plus eight times the clearance distance divided into the product of the trolley length multiplied by itself.

According to still a further aspect of a system according to the present invention, the two rail systems may be provided in a substantially parallel relationship.

According to yet a further aspect of a system according to the present invention, a first rail may be substantially straight along its length, and a second rail may be substantially straight along its length, but the first and second rail may be provided in an unparallel, or diverging relationship.

According to another aspect of a system according to the present invention, a first rail and a second rail may be adjacent and coaxial.

According to still another aspect of a system according to the present invention, a first rail and a second rail are tubular members having longitudinal lumens and the first rail and second rail are coupled at a rail joint. A rail joint may include a first plug inserted into the first rail and a second plug inserted into the second rail. Further, at least one reinforcement member may extend through an abutment of said the first rail and second rail and between the first and second plugs. Further adhesive may at least substantially fill the longitudinal lumens in the first and second rail between the first and second plugs.

A method for restraining a plurality of live animals according to the present invention includes the step of providing a first rail system including a first trolley and a second trolley, each trolley being longitudinally slidable along a rail. The method further includes the step of coupling a first animal to the first trolley, thereby restraining movement of the first animal to a first roaming envelope. The method also includes the step of coupling a second animal to the second trolley, thereby restraining movement of the second animal to a second roaming envelope.

According to another aspect of a method according to the present invention, the first and second roaming envelopes may overlap or may be distinct, with no overlap. The method may also include the steps of determining the first roaming envelope and determining the second roaming envelope.

BRIEF DESCRIPTION OF THE DRAWINGS

FIG. 1 is a top perspective partial section view of a portion of an embodiment of an animal restraint apparatus according to the present invention.

FIG. 2 is a left elevation view of the embodiment of FIG. 1.

FIG. 3 is a top perspective view of a second embodiment of an animal restraint trolley according to the present invention.

DESCRIPTION OF THE PREFERRED EMBODIMENT

Figure 4:
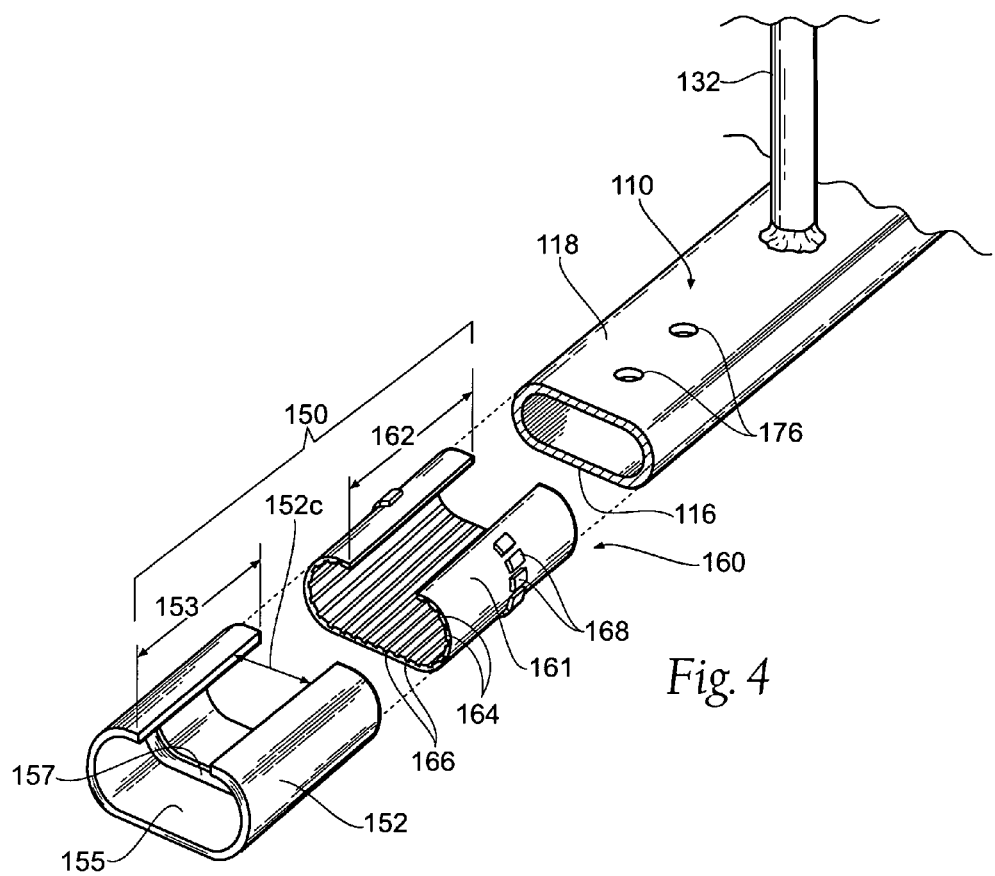
FIG. 4 is a bottom perspective partial assembly view of the embodiment of FIG. 1.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Turning now to the Figures, FIG. 1 and FIG. 2 depict a portion of an embodiment 100 of an animal restraint apparatus according to the present invention. Generally, the apparatus 100 comprises a rail 110, at least one rail support 130, and a trolley 150.

The rail 110 is formed preferably along a longitudinal axis 112 and has a cross-section preferably in the general shape of an oval, wherein two semiannular sidewalls 114 are joined by a generally planar top wall 116 and a generally planar bottom wall 118. While the terms "top" and "bottom" are utilized, such terms are for descriptive purposes only, and the "top" wall does not necessarily need to be installed above the "bottom" wall, i.e., the terms do not necessarily reference any final, or use case, positioning. Although the rail 110 may be solid, the sidewalls 114, top wall 116, and bottom wall 118 preferably at least partially surround an inner lumen 120; thus, the rail 110 may be provided as a tubular rail. While the rail 110 shown is a generally oval rail, which provides an advantageous arrangement that prevents rotation of the trolley 150 about the longitudinal axis 112 of the rail 110, other rail cross-section shapes are contemplated by the invention; rectangular, I-beam, and even circular, for example. The rail 110 is preferably made out of a relatively rigid, supportive material, such as aluminum, and the walls 114, 116, 118 are preferably substantially equal in thickness. The rail 110 is preferably provided as a straight rail along at least a portion of its length along its longitudinal axis 112.

Additionally or alternatively, the rail 110 may be provided with some curvature. Discussed below, a preferred minimum radius of the rail 110 may be determined.

A preferred rail support 130 includes at least one rail strut 132, which preferably extends completely through the bottom wall 118 of the rail 110 and at least partially into the top wall 116 of the rail 110. Other various rail supports 130 are contemplated, such as a generally planar support plate (not shown) that is coupled to the bottom wall 118 of the rail 110, running generally coplanar to the longitudinal axis 112 of the rail 110. While such support 130 is contemplated, it may well increase the cost and weight of the apparatus 100. The support strut 132 is preferably coupled to the bottom wall 118 of the rail 110, such as by welding 134, or other similar means, including adhesive. As can be seen better in FIG. 5, a second weld 136 may be provided to couple the support strut 132 to the top wall 116 of the rail 110.

Returning to FIG. 1 and FIG. 2, a preferred animal restraint trolley 150 includes a trolley carriage 152, adapted to slide along the rail 110 longitudinally, and a leash hitch 154. The trolley 150 may also include a slide bearing 160 disposed between the trolley carriage 152 and the rail 110, which may be used to reduce friction. As seen in FIG. 2, the slide bearing 160 may be spaced from the rail by a desired clearance 151. As discussed further below, this clearance 151 may be used in calculating a preferred radius for curves that may be introduced along a length of the rail 110.

The trolley carriage 152 is provided along a trolley length 153, as seen in FIG. 4. The trolley carriage 152 is formed to preferably have an inner surface 155 adapted to interface to a desired rail 110 or adapted to support a bearing 160 which is adapted to interface to a desired rail 110. Like the preferred rail 110, the trolley carriage 152 preferably includes two semiannular sidewalls 152a. However, rather than being coupled by both a top wall and a bottom wall, like sidewalls 114 of the rail 110, the sidewalls 152a of the trolley carriage 152 are preferably joined only by a top wall 152b, thus leaving a space 152c between an end of each sidewall 152a. Once the trolley 150 is slid onto the rail 110, the space 152c allows the trolley carriage 152 to slide along the rail 110 without interference from the rail support 130. The trolley carriage 152 may be formed from any material suitable to withstand expected stresses. A preferred trolley carriage 152 may be formed from steel, perhaps stainless, plate that is heated and bent to the desired shape.

The leash hitch 154 preferably comprises a plate member coupled to the top wall 116 of the trolley carriage 152, such as by welding or other means, generally parallel to the longitudinal axis 112 of the rail 110 on which the trolley 150 is to be situated. The hitch plate member may also be coupled to the trolley carriage 152 at some other desirable angle. The hitch 154 further provides or includes an aperture 156 formed therethrough, to provide an anchor point for, e.g., a leash 400 to be secured by a knot 402, or a cable to be secured by a cable link (not shown). FIG. 3 depicts an alternate embodiment 250 of an animal restraint trolley according to the present invention. Like the first embodiment 150, this embodiment 250 includes a trolley carriage 252, similar to or the same as the first trolley carriage 152, and a leash hitch 254. The hitch 254 of this alternate embodiment 250, however, is provided as a bent rod, which is coupled to the lateral sides of the trolley 250, providing an aperture 256 to allow a leash 400 to be looped therethrough and secured to the trolley 250.

Turning now to FIG. 4, a partial assembly of an apparatus according to the present invention may be seen. While the trolley 150 may be slid directly onto the rail 110, a slide bearing 160 is preferably utilized to minimize friction between the trolley carriage 152 and the rail 110. The slide bearing 160 preferably includes a split bearing body 161 made of low-slip plastic, such as that disclosed in U.S. Pat. No. 6,113,275, issued to Blase, which is incorporated herein by reference in its entirety. The preferred bearing body 161 is provided along a bearing length 162, which is preferably the same as or less than the trolley carriage length 153. The bearing 160 also has a plurality of ridges 164 and corresponding grooves 166 on a first surface and retaining tabs 168 on a second surface, which is disposed opposite the first surface. The ridges 164 are preferably adapted to run generally parallel to the longitudinal axis 112 of a rail 110 onto which the trolley 150 is placed. The retaining tabs 168 cooperate with a mating groove 157 provided on the inner surface 155 of the trolley carriage 152. The mating groove 157 is preferably provided with two bearing retainer stops 157a,b as seen in FIG. 2. The bearing retainer stops 157a,b prevent the bearing 160 from radially sliding along the inner surface 155 of the trolley carriage 152. While the bearing 160 may be adhered to the trolley carriage 152, such as by an adhesive, it has been found that when properly dimensioned and assembled, no adhesion is required, which eases bearing replacement.

Figure 5:
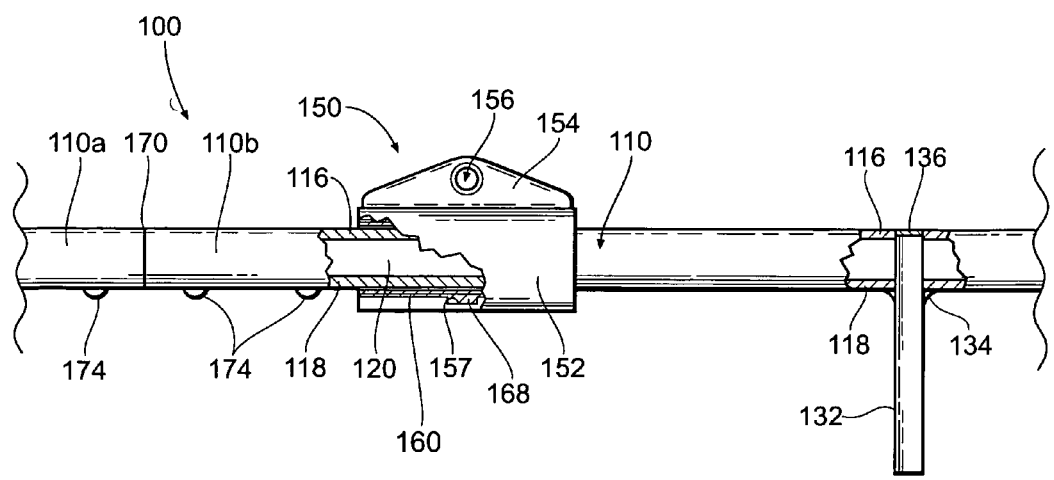
FIG. 5 is a front elevation partial cut-away view of the embodiment of FIG. 1.
Figure 6:
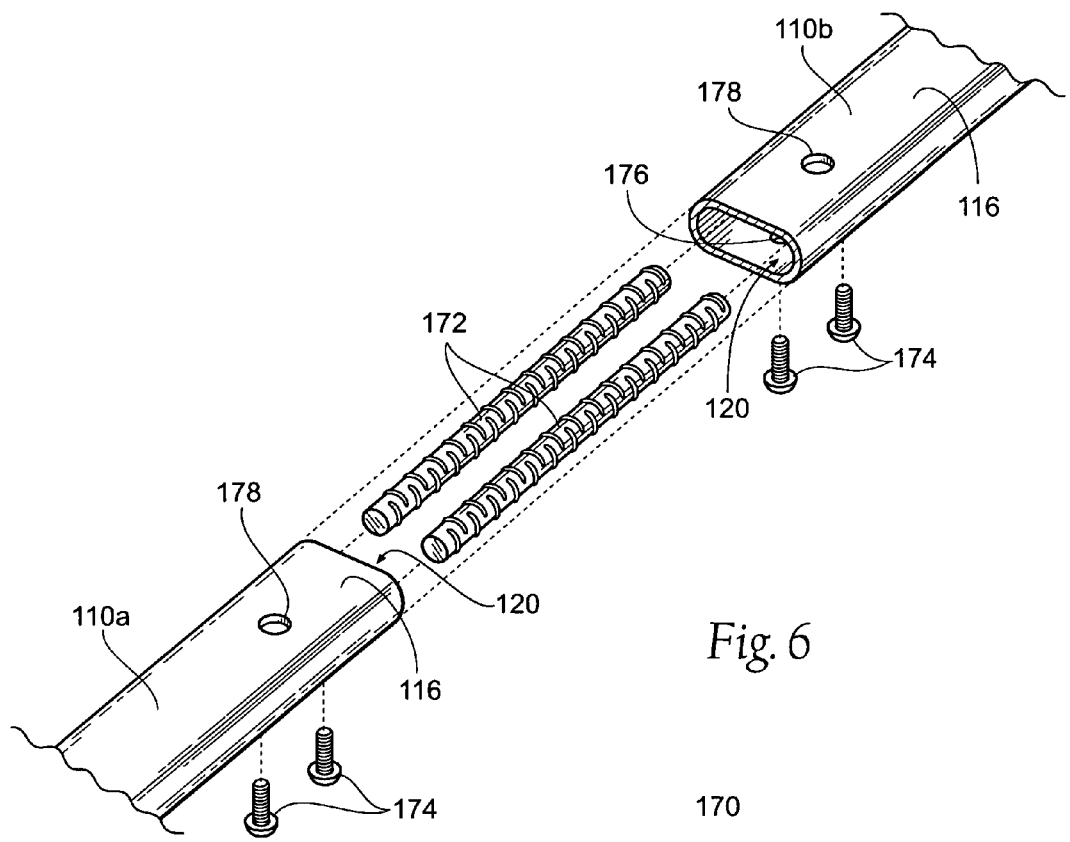
FIG. 6 is a top perspective partial assembly view of an embodiment of a rail joint according to the present invention.
Figure 7:
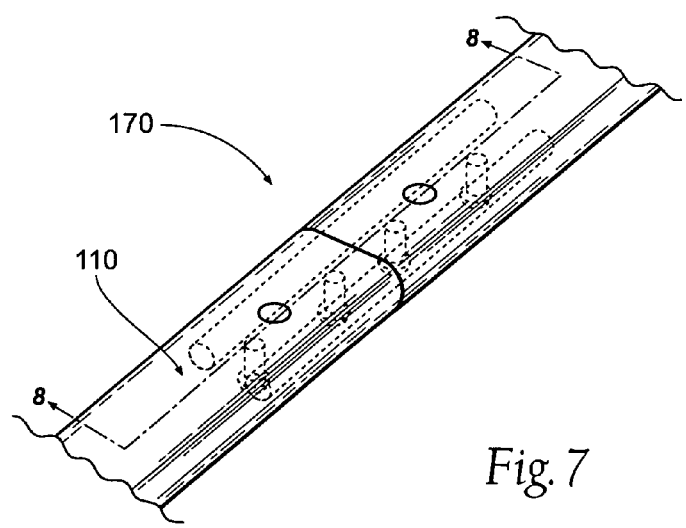
FIG. 7 is a top perspective view of an assembled rail joint according to the present invention.
Figure 8:
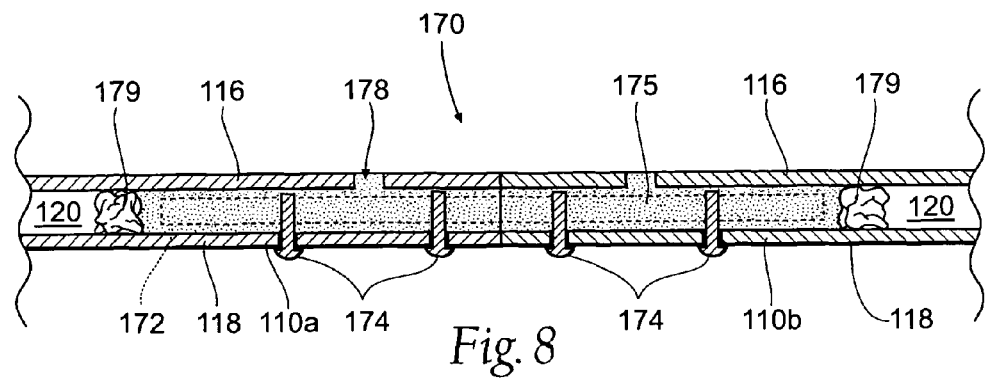
FIG. 8 is a front elevation cross-section view taken along line 8-8 of FIG. 7.

Turning now to FIG. 5, an assembled apparatus 100 may be seen, including partial cut-away sections to show some details as already described. It may be necessary or desirable to provide the rail 110 in a plurality of rail sections 110a,b and then to join the provided sections 110a,b at a joint 170 to complete a rail 110 for final installation at an assembly site. An assembly view of a preferred rail joint 170 may be seen in FIG. 6, a completed joint 170 may be seen in perspective view in FIG. 7 and in cross-section in FIG. 8. Referring to FIGS. 6-8, a preferred joint 170 includes at least one, but preferably two reinforcing members 172, such as lengths of steel reinforcing bar, or rebar. Also provided are a plurality of support studs 174, which may be threaded bolts, adapted to extend at least partially into the lumen 120 of the rail 110 through a plurality of support stud holes 176 provided through the bottom surface 118 of the rail. Access holes 178 are provided through a surface of the rail 110, preferably the top surface 116. To assemble the joint 170, a first rail member 110a is provided, the first rail member 110a having an open end in fluid communication with an interior lumen 120. A second rail member 110b is provided, the second rail member 110b having an open end in fluid communication with an interior lumen 120. A plug 179 is inserted a first distance into the first rail member 110a; likewise, a plug 179 is inserted a second distance into the second rail member 110b. The first and second distances into the first and second rails, respectively, that the plugs 179 are inserted are preferably substantially equal. At least one reinforcing member 172 is inserted into the first rail member 110a and the second rail member 110b, and the ends of the rail members 110a, b are abutted. An adhesive material 175 is then injected into the interior lumen 120 of at least one of the rail members 110a or 110b through an access hole 178, thereby at least substantially filling the portion of the lumen 120 between the plugs 179. If desired, the adhesive material 175 may be injected into an access hole 178 provided on each rail member 110a and 110b. If used, the support studs 174 may be inserted into the rail members 110a,b prior to the injection of the adhesive material 175 or after the injection of the adhesive material 175.

Figure 9A:
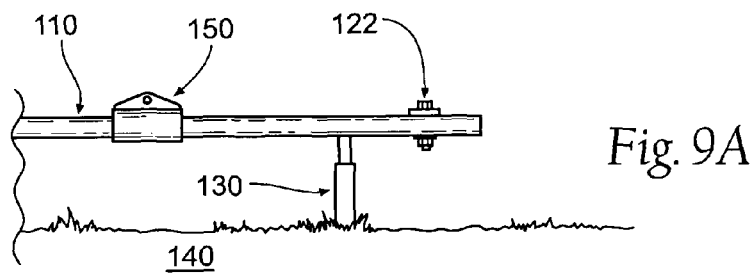
FIG. 9A is a front elevation view of a first embodiment of an animal restraint rail termination according to the present invention.
Figure 9B:
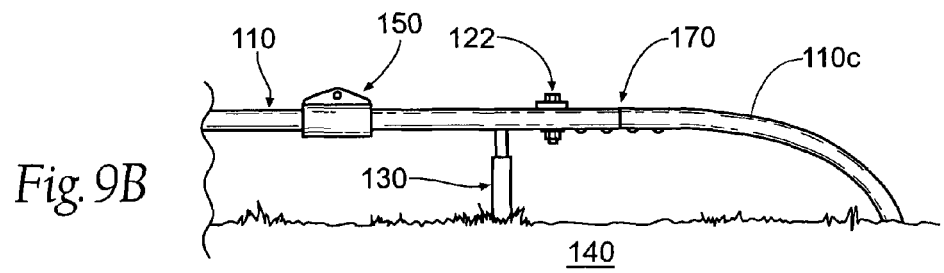
FIG. 9B is a front elevation view of a second embodiment of an animal restraint rail termination according to the present invention.
Figure 9C:
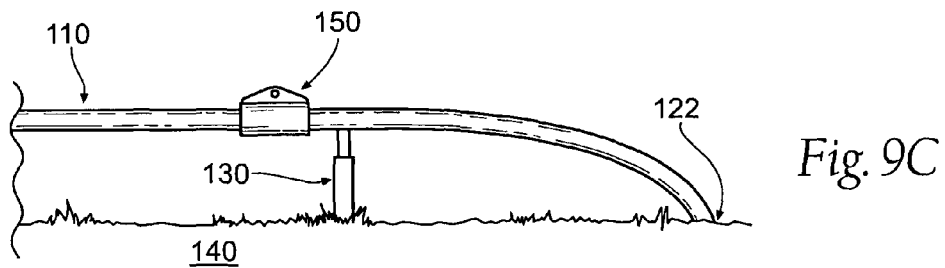
FIG. 9C is a front elevation view of a third embodiment of an animal restraint rail termination according to the present invention.
Figure 9D:
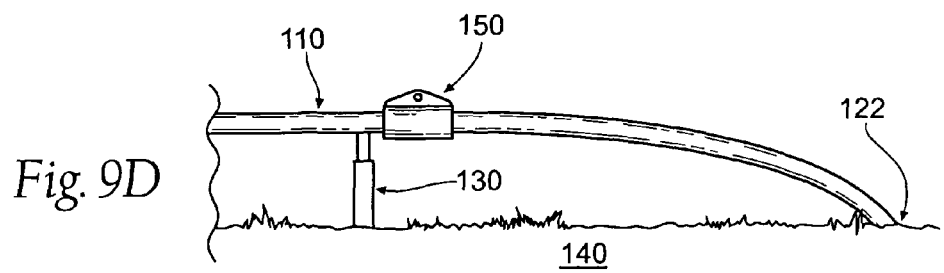
FIG. 9D is a front elevation view of a fourth embodiment of an animal restraint rail termination according to the present invention.

FIGS. 9A-9D provide embodiments of rail terminations according to the present invention. FIG. 9A provides a simple rail termination, including a trolley stop 122 provided near the end of a straight section of rail 110. The trolley stop 122 may be as simple as a bolt extending through the rail 110, preferably perpendicular to the longitudinal axis 112 of the rail 110. Additionally, the trolley stop 122 may be provided with a type of bumper, such as a rubber washer, to silence the impact of the trolley 150 and the stop 122. While simple, the rail termination of FIG. 9A may prove undesirable in certain situations and could lead to entanglements of a leash that is coupled to the trolley 150. Therefore, it may be advantageous to extend the rail 110 beyond a simple, exposed end, to bury the end of the rail 110 into the ground 140, such as shown in FIGS. 9B-9D. Provided that an animal coupled to a trolley 150 disposed on the rail 110 cannot crawl beneath the rail 110, such an arrangement should prevent any leash entanglement. As a part of an animal restraint system kit, a sloped rail 110c may be provided to be joined at a joint 170 to a rail portion, as shown in FIG. 9B. Alternatively, the sloped rail may be formed integrally with a section of rail 110, as shown in FIGS.

9C and 9D, which depict alternate embodiments of the sloped rail. FIG. 9C depicts a more abrupt trolley stop 122 formed by the junction of the rail 110 with the ground 140. FIG. 9D depicts a trolley stop 122 having a more gradual transition from rail 110 to ground 140. Thus, as an animal is running along the rail 110, different forces will be transferred to the leash 400 that is coupled to the trolley 150. For instance, the sloped rail in FIG. 9C will apply a more sudden stop, akin to, though not as severe as, the trolley 150 encountering the trolley stop 122 of FIG. 9A. The sloped rail in FIG. 9D, however, will more gradually apply resistive force to a leash 400, thus providing a longer warning period to the animal that a trolley stop 122 is soon approaching. Rather than being buried into the ground 140, the end of the rail 110 may be formed to create a trolley stop 122, such as by having a flared end, or by being bent at an angle relative to the rest of the rail 110 so as to stop longitudinal trolley movement when the trolley 150 hits the bend. If desired to use the end of the rail 110, itself, as a trolley stop 122, either in conjunction with the ground 140 or by deformation of the rail, as described, it is important to prevent wedging or trolley lock-up. Such lock-up, where the trolley 150 becomes substantially immovable, may occur where the radius of any curvature along a length of the rail 110 is less than a preferred minimum radius, as further described below, in connection with FIG. 13.

Figure 10:
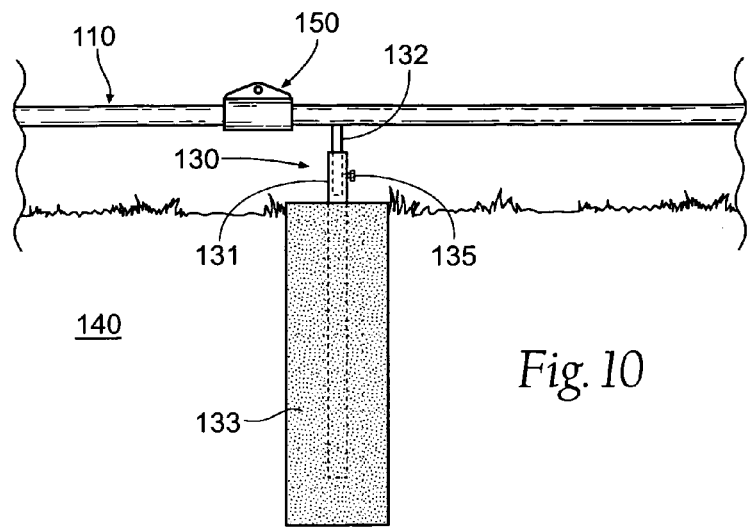
FIG. 10 is a front elevation view of a first embodiment of an animal restraint rail anchor according to the present invention.

FIG. 10 details a first embodiment 130 of an animal restraint rail support according to the present invention. Such support 130 may be suited for supporting the rail 110 above a relatively soft surface 140, for example a grass covered lawn, or other soil surface. The rail support 130 includes an anchor sleeve 131 adapted to receive a rail support strut 132, the anchor sleeve 131 being relatively stationarily supported by a footing 133, which may be a poured concrete footing. Through the anchor sleeve 131 is provided a set bolt 135 that frictionally engages the support strut 132.

Figure 11A:
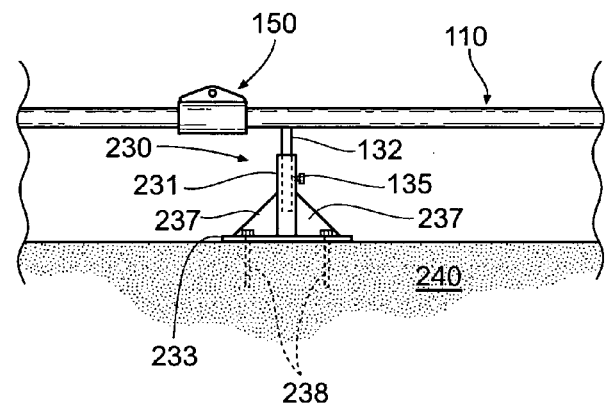
FIG. 11A is a front elevation view of a second embodiment of an animal restraint rail anchor according to the present invention.
Figure 11B:
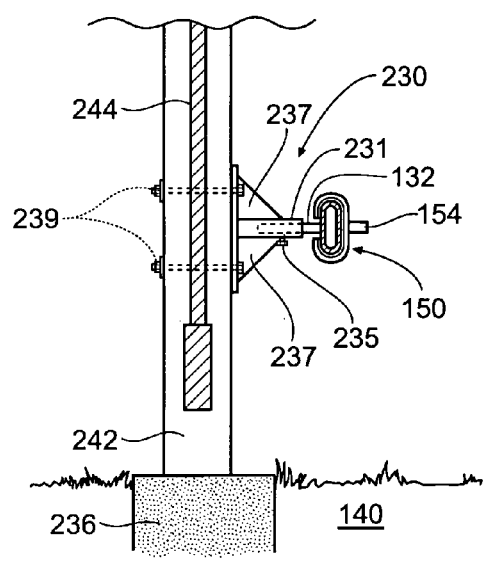
FIG. 11B is cross-section view of a third embodiment of an animal restraint rail anchor according to the present invention mounted on a vertical support surface, the view taken along line 12-12 of FIG. 13.
Figure 13:
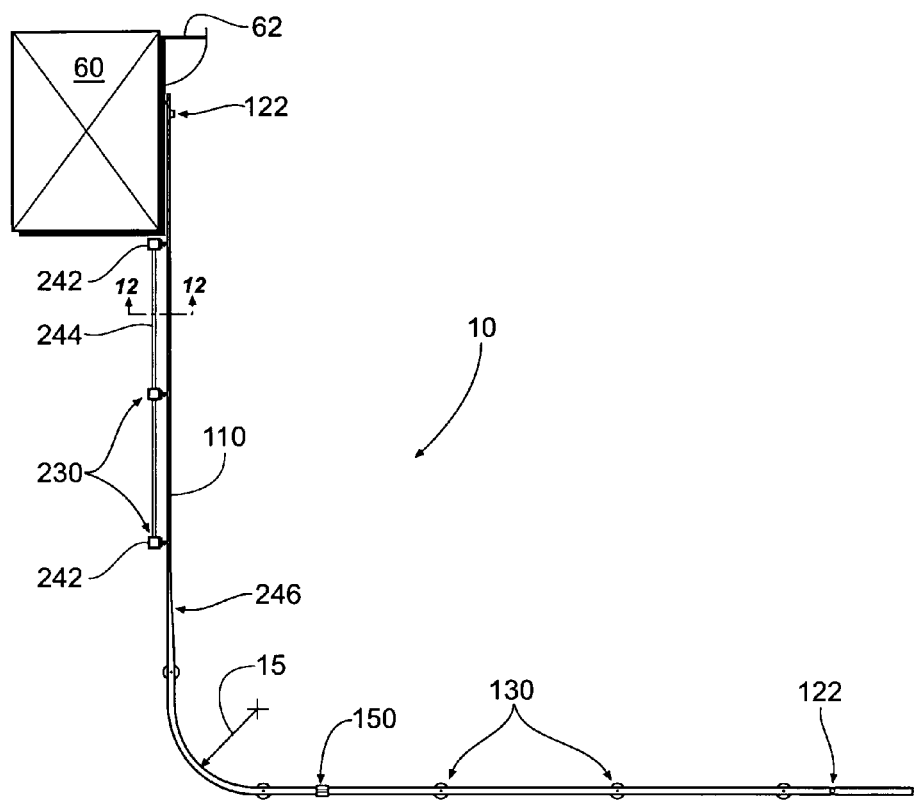
FIG. 13 is a top plan view of an embodiment of an animal restraint system according to the present invention.

A second embodiment 230 of a rail support according to the present invention is shown in FIG. 11A and FIG. 11B. This rail support 230 may be advantageously used on a relatively solid horizontal surface 240, such as a poured concrete driveway or wooden deck, as shown in FIG. 11A, or a vertical support surface 242, such as a fence post as shown in FIG. 11B, a tree, or even a building, as shown in FIG. 13. The rail support 230 in this embodiment includes an anchor sleeve 231 adapted to receive a rail support strut 132, the anchor sleeve 231 being relatively stationarily mounted to an apertured base plate 233. Reinforcement gussets 237 may be provided to support the anchor sleeve 231 at a desired position relative to the base plate 233 such as substantially orthogonal thereto. As seen in FIG. 11A, the gussets 237 may be provided on diametrically opposed sides of the anchor sleeve 231, the gussets provided in a plane that is substantially parallel to the longitudinal axis 112 of the rail 110. Alternatively or additionally, as seen in FIG. 11B, the gussets 237 may be provided in a plane that is oblique to the longitudinal axis 112 of the rail, such as being substantially orthogonal thereto. It is to be understood that a plurality of pairs of gussets 237 may also be used. The apertured base plate 233 may be anchored to a support surface 240, 242 by the use of fasteners, such as masonry screws 238, nails, lag bolts 239, wood screws, and the like. The displayed vertical support surface 242 is a wooden fence post, such as a 4×4 timber having at least one flat surface along its length, anchored to the ground 140 by a concrete footing 236 and supporting a fence panel 244, picketed or solid.

Figure 12:
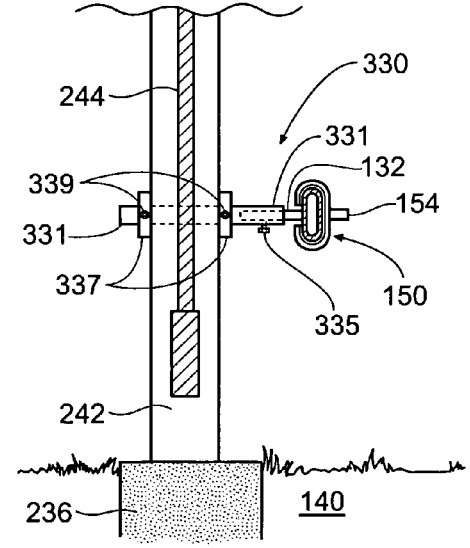
FIG. 12 is cross-section view of a an alternate embodiment of an animal restraint rail anchor according to the present invention mounted on a vertical support surface.

A third embodiment 330 of a rail support according to the present invention is shown in FIG. 12.

Like the first and second embodiments 130,230, this embodiment 330 includes an anchor sleeve 331. However, rather than terminating into a foundation 133 or a baseplate 233, the anchor sleeve 331 extends at least partially into, and preferably through, a support structure 242, for example a wooden fence post, such as a 4×4 timber having at least one flat surface along its length, anchored to the ground 140 with a concrete footing 236 and supporting a fence panel 244, picketed or solid. Thus, a hole (not shown) is drilled through the fence post 242 so that the anchor sleeve 331 may be placed therein. Provided on each side of the fence post 242 is a shaft collar 337, each having a set screw 339 for engaging and securing the collar 337 to the sleeve 331, adjacent to the fence post 242. Although depicted as a shaft collar 337 including a radial set screw 339, it is to be understood that other types of shaft collars 337 may be used, such as single or dual split shaft collars including tightening bolts provided skew to a longitudinal axis (not shown) about which the anchor sleeve 331 is formed. The anchor sleeve 331 is adapted to receive a rail support strut 132, and includes a set bolt 335 adapted to engage and secure the rail support strut 132 in the anchor sleeve 331, thus supporting a rail 110 above the ground 140 at a desired height, preferably between ten and thirty inches, and more preferably about twenty-four inches.

Figure 14:
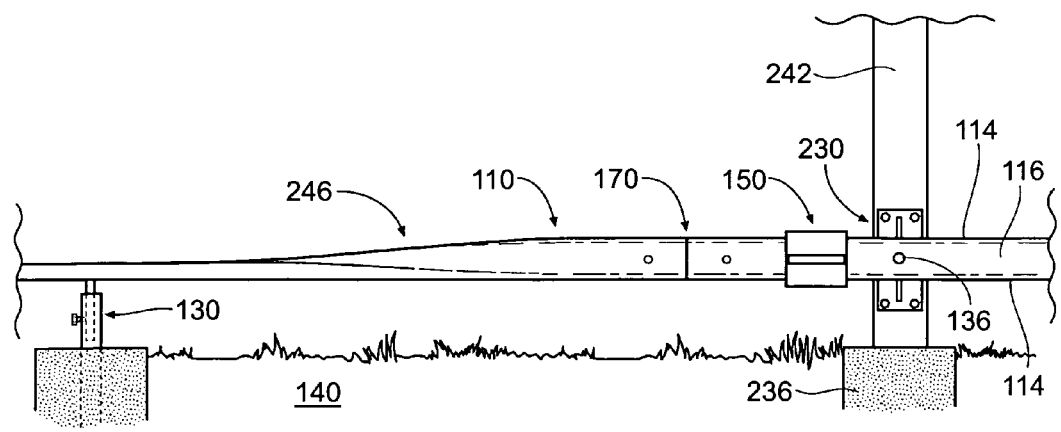
FIG. 14 is a front elevation view of a portion of the embodiment of FIG. 13 transitioning between a vertical support surface and a horizontal support surface.

FIG. 13 shows a first embodiment 10 of an animal restraint system according to the present invention. A rail 110 is anchored to a vertical support structure, namely a building 60 proximate a door 62, then to at least one, but preferably a plurality of fence posts 242. A twist 246 is then provided in the rail 110 so as to transition from being supported on a vertical support structure, such as the fence or building, to being supported on a horizontal support surface, such as the ground. FIG. 14 shows an elevation view of the provided twist 246. Returning to FIG. 13, trolley stops 122 are provided at desired points along the rail 110 such as closer to the ends of the rail 110 than the midpoint of the rail 110. Further, a radius 15 may be provided so as to alter the otherwise straight path of the rail 110, and the rail 110 extends along a desired length, supported by at least one but preferably a plurality of rail supports 130. Regarding the radius 15, it may be desirable to calculate a minimum desirable radius to allow a trolley 150 to travel smoothly around the curve created by the radius 15. One method of calculating a preferred minimum radius 15 relates to (C) the total lateral clearance 151 (C) between the rail 110 and the innermost surface of the trolley 150, either the trolley carriage inner surface 155 or the bearing 160. Also factoring into the calculation is the length (L) of the innermost surface of the trolley 150, either the trolley carriage inner surface 155 or the bearing 160, respectively. For instance a preferred total lateral clearance 151 is between about 0.020 inches and about 0.030 inches and more preferably about 0.026 inches. Presuming a trolley length 153, or if used, a bearing length 162, of three inches, a preferred minimum radius 15 may be determined by squaring the length 153 or 162 and dividing the result by the product of eight times the clearance 151 and adding one half of the clearance 151. Thus, the formula to determine a preferred minimum radius (PMR) 15 may be represented as follows:

$$PMR = \frac{L^2}{8 \times C} + \frac{C}{2}$$

Thus, if a preferred clearance 151 is 0.026 inches and the length of the innermost surface is three inches, the PMR is 43.282 inches, or about 44 inches. While a curve having a radius 15 less than the PMR may function sufficiently, such radius would cause the bearing 160 or trolley inner surface 155 to rub against the rail 110 throughout the travel distance of the curve, thereby causing wear and requiring more frequent bearing replacement.

Figure 15:
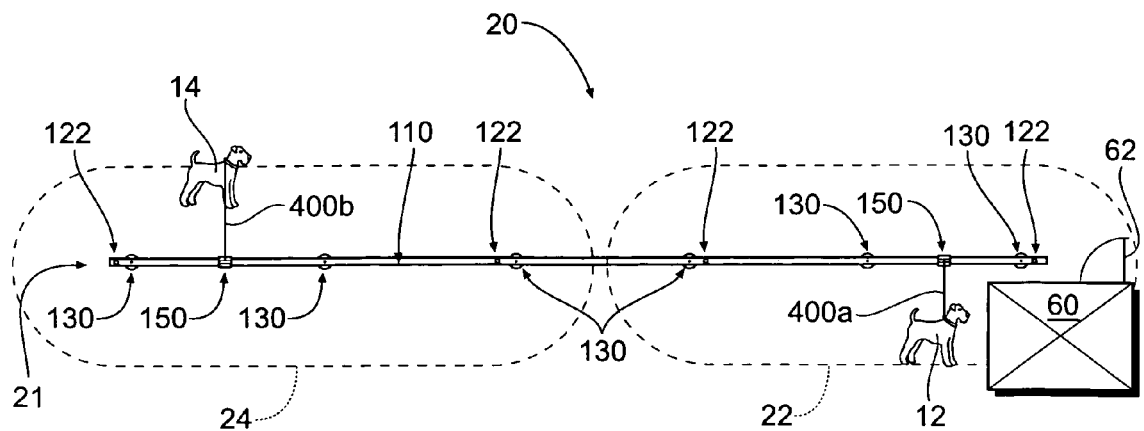
FIG. 15 is a top plan view of a second embodiment of an animal restraint system according to the present invention, which is adapted to accommodate a plurality of animals.

Turning now to FIGS. 15-18, various embodiments of animal restraint systems can be seen. FIG. 15 provides a second embodiment 20 of an animal restraint system, which may be utilized to restrain a plurality of animals along a single rail 110. A first rail system 21 is shown as a substantially straight run of rail 110, supported by a plurality of rail supports 130, a plurality of trolleys 150 longitudinally slidable along the rail 110, each of the trolleys 150 being slidable between two trolley stops 122. A first animal 12, such as a dog, is restrained by a first leash 400a to one trolley 150 and is allowed movement within a first roaming envelope 22. A second animal 14, such as another dog, is restrained by a second leash 400b to another trolley 150 and is allowed movement within a second roaming envelope 24. While the roaming envelopes 22,24 may overlap, it is preferred that they do not, so as to maintain desired separation of the animals 12,14. The respective size of each roaming envelope 22 or 24 is a function of the length of the associated leash 400a or 400b, the positioning of the trolley stops 122 and may depend upon the size of the animal 12 or 14. As shown, the length of a roaming envelope along a rail 110 is preferably greater than the extension of the roaming envelope perpendicular away from the rail 110. Such arrangement is believed to train a restrained animal to move along a rail 110 rather than away from the rail 110.

Figure 16:
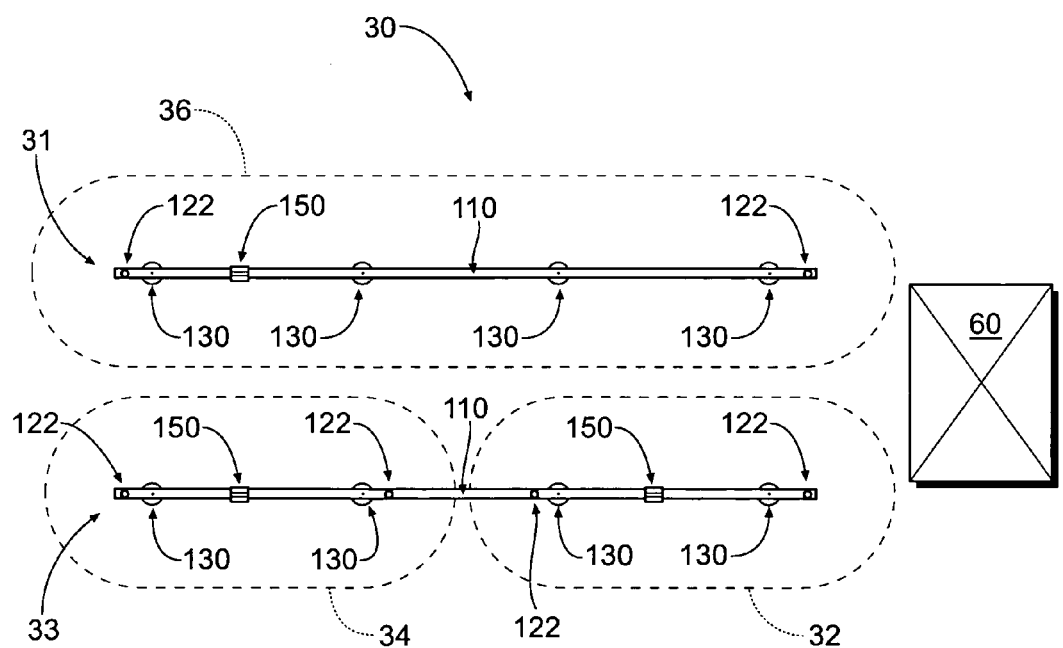
FIG. 16 is a top plan view of a third embodiment of an animal restraint layout according to the present invention, which is adapted to accommodate a plurality of animals.

FIG. 16 depicts a third embodiment 30 of an animal restraint system, which is adapted to restrain a plurality of animals to a plurality of rails 110, which may be at least substantially parallel. A first rail system 31 is shown as a substantially straight run of rail 110, supported by a plurality of rail supports 130, a trolley 150 longitudinally slidable along the rail 110 between two trolley stops 122. A second rail system 33, similar to the rail system 21 of the second embodiment 20, is situated preferably substantially parallel to the first rail system 31. Although possible, it is preferable to not overlap the roaming envelopes 32,34,36 so as to maintain desired spacing between animals to prevent aggressive interaction. Though shown supported by rail supports 130, one or both of the rail systems may be supported on a vertical support surface. Alternatively, the first rail system 31 may be substituted with another second rail system 33, or the second rail system 33 may be substituted with another first rail system 31.

Figure 17:
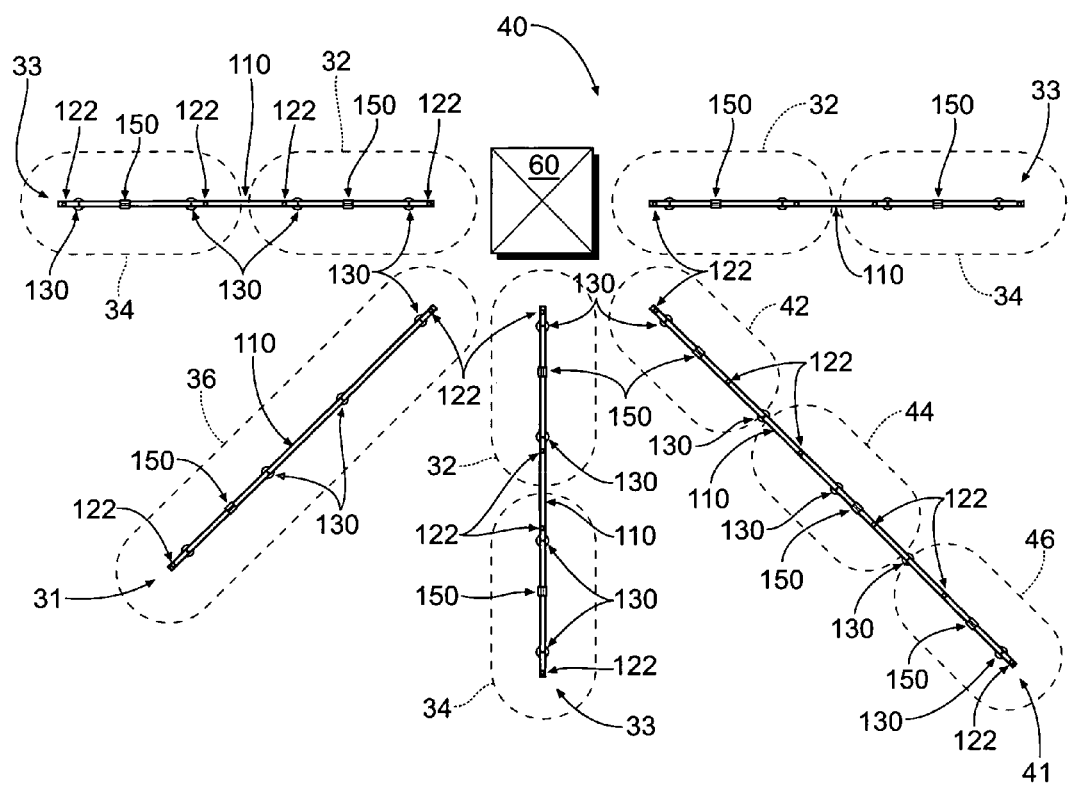
FIG. 17 is a top plan view of a fourth embodiment of an animal restraint layout according to the present invention, which is adapted to accommodate a plurality of animals.

A fourth embodiment 40 of an animal restraint system is shown in FIG. 17. Such exemplary system 40 may prove advantageous to persons requiring restraint of many, perhaps different size, animals, such as a humane society, an animal rescue organization, or a kenneling service. In this embodiment 40, a plurality of rail systems project or emanate from a generally central location, such as a building 60. Each rail system may facilitate restraint of one or more animals. For instance, one rail system 31 may be provided to restrain one animal within a first roaming envelope 36. Other rail systems 33 may be provided to restrain two animals, a first animal in a first roaming envelope 32 and a second animal in a second roaming envelope 34. More than two animals may be restrained by a single rail system, such as a rail system 41 adapted to restrain three animals, one in a first roaming envelope 42, one in a second roaming envelope 44, and one in a third roaming envelope 46. The envelopes are maintained by the cooperation of the various trolleys 150 and accompanying leashes (not shown), the trolley stops 122 and rails 110.

Figure 18:
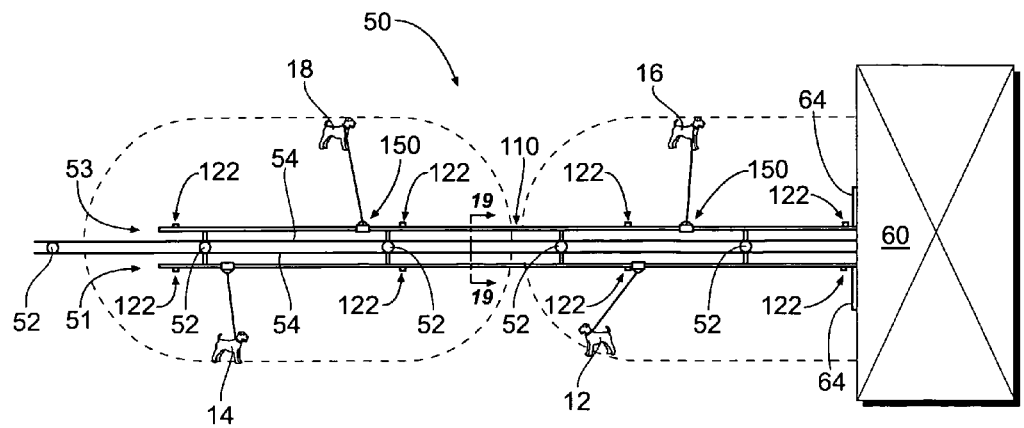
FIG. 18 is a top plan view of a fifth embodiment of an animal restraint system according to the present invention, which is adapted to accommodate a plurality of animals.
Figure 19:
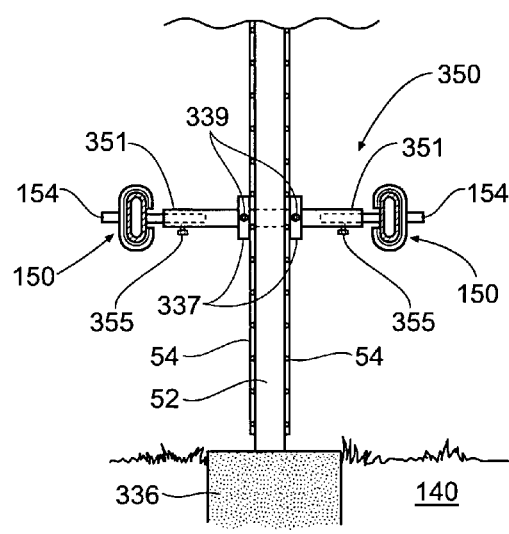
FIG. 19 is cross-section view of a fourth embodiment of an animal restraint rail anchor according to the present invention mounted on a vertical support surface, the view taken along line 19-19 of FIG. 18.

Also of use to organizations mentioned in connection with the previous embodiment may be a fifth embodiment 50 of an animal restraint system that is shown in FIG. 18 and FIG. 19. This embodiment 50 provides the advantage of allowing animal movement along respective rails 110, while minimizing the space required for the structure. That is, this embodiment 50 provides similar functionality to the third embodiment 30 in FIG. 16, but utilizing only about half the space. This fifth embodiment 50 includes a central dividing fence 54, which may be a chain link fence including steel fence posts 52 anchored in a concrete footing 336. A first rail system 51 is mounted towards one side of the fence posts 52, and a second rail system 53 is mounted to the other side of the fence posts 52. The first rail system 51 restrains a first animal 12 and a second animal 14, and the second rail system restrains a third animal 16 and a fourth animal 18. The rail systems 51,53 are preferably coupled to the same fence posts 52, extending away from a building 60, which may include animal access doors 64. Thus, a caretaker (not shown) standing in the building 60, may couple an animal to a leash, which is in turn coupled to a trolley 150, thereby sending the coupled animal out of an animal access door 64. A portion of the fence 54 may extend beyond the trolley stops 122 located near the ends of the rails 110, so that, for example, the second animal 14 and the fourth animal 18 are substantially prevented from interaction. FIG. 19 depicts a preferred dual rail support 350. Similar to the alternative rail support 330 in FIG. 12, this embodiment 350 includes an extended anchor sleeve 351 to support a rail 110 on either side of a fence post 52, supporting the rails 110 preferably substantially the same distance above a support surface 140, such as the ground. A preferred distance is between about ten inches and about thirty inches, and more preferably about twenty-four inches.

Figure 20:
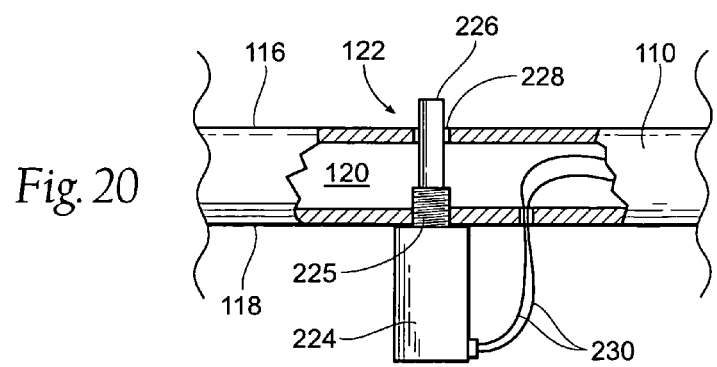
FIG. 20 is a front elevation partial cut-away view of an embodiment of a trolley stop according to the present invention.

In connection with any of the rail system embodiments, and especially those to be used with a plurality of animals, one or more trolley stops 122 may be provided as remotely operable and/or selectively activateable trolley stops, as shown in FIG. 20. For example, an electric solenoid 224, such as a push solenoid, may be utilized for activating and deactivating a trolley stop 122. The solenoid 224 may be supported by a bottom wall 118 of a rail 110, such as by being threadably engaged 225 therewith. When energized, the solenoid 224 may force a plunger 226 through an opening 228 formed in a top wall 116 of the rail 110 at a desired location. In such a case, electrical wiring 230 may be run through a lumen 120 in the rail 110 if the rail 110 is provided as a tubular member. If the rail 110 is not provided as a tubular member, or if otherwise desired, a conduit member (not shown) may be coupled to the rail 110 along the bottom surface 118. To allow a trolley 150 free passage over the rail 110, the conduit member may have an outside diameter that is preferably narrower than an associated trolley carriage gap 152c.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. An animal restraint apparatus comprising:
  a rail formed about, and in a length along, a longitudinal axis, said rail having a rail bottom wall and a rail top wall opposed from said rail bottom wall, said rail bottom wall and said rail top wall formed along at least a portion of said length;
  a trolley longitudinally slidable along said rail, said trolley comprising:

a trolley carriage disposed along a trolley length around a majority of said rail, said majority of said rail including said top wall; and
a leash hitch coupled to said trolley carriage;
at least one rail support member coupled to and adapted to support said rail;
at least one trolley stop in operative connection with said rail, said trolley stop adapted to prevent longitudinally sliding movement of said trolley in a first direction along said rail; and
a slide bearing disposed between at least a portion of an inner surface of said trolley carriage and a portion of said rail, said slide bearing comprising:
a bearing body having a first surface and a second surface;
a plurality of ridges disposed on said first surface, said ridges being at least substantially parallel to said longitudinal axis of said rail; and
at least one retaining tab disposed on said second surface, at least one of said at least one retaining tab extending into a groove formed in said trolley carriage inner surface.

2. An animal restraint apparatus according to claim 1, said bearing provided along a bearing length, said bearing length being equal to or less than said trolley length.

3. An animal restraint apparatus comprising:
a rail formed about, and in a length along, a longitudinal axis, said rail having a rail bottom wall and a rail top wall opposed from said rail bottom wall, said rail bottom wall and said rail top wall formed along at least a portion of said length;
a trolley longitudinally slidable along said rail, said trolley comprising:
a trolley carriage disposed at least partially around said rail; and
a leash hitch coupled to said trolley carriage;
at least one rail support member coupled to and adapted to support said rail; and
at least one trolley stop in operative connection with said rail, said trolley stop adapted to prevent longitudinally sliding movement of said trolley in a first direction along said rail; and
a slide bearing disposed between at least a portion of said trolley carriage and a portion of said rail, said slide bearing comprising:
a bearing body having a first surface and a second surface;
a plurality of ridges disposed on said first surface, said ridges being at least substantially parallel to said longitudinal axis of said rail; and
at least one retaining tab disposed on said second surface.

4. An animal restraint system comprising:
a first rail system comprising:
a first rail formed about, and in a first rail length along, a first longitudinal axis, said first rail having a first rail bottom wall and a first rail top wall opposed from said first rail bottom wall, said first rail bottom wall and said first rail top wall formed along at least a portion of said first rail length;
a first trolley longitudinally slidable along said first rail, said first trolley comprising:
a first trolley carriage disposed at least partially around said first rail; and
a first leash hitch coupled to said first trolley carriage;
at least one first rail support member coupled to and adapted to support said first rail; and
at least one trolley stop in operative connection with said first rail, said trolley stop adapted to prevent longitudinally sliding movement of said first trolley in a first direction along said first rail;
a second rail system comprising:
a second rail formed about, and in a second rail length along, a second longitudinal axis, said second rail having a second rail bottom wall and a second rail top wall opposed from said second rail bottom wall, said second rail bottom wall and said second rail top wall formed along at least a portion of said second rail length;
a second trolley longitudinally slidable along said second rail, said second trolley comprising:
a second trolley carriage disposed at least partially around said rail; and
a second leash hitch coupled to said second trolley carriage;
at least one second rail support member coupled to and adapted to support said second rail; and
at least one trolley stop in operative connection with said second rail, said trolley stop adapted to prevent longitudinally sliding movement of said second trolley in a second direction along said second rail;
a first support structure to which said first rail support is anchored; and
a second support structure to which said second rail support is anchored
wherein said first rail and said second rail are adjacent and coaxial, and further wherein said first rail and said second rail are tubular members having longitudinal lumens, said first rail and said second rail being coupled at a rail joint, said rail joint comprising:
a first plug inserted into said first rail;
a second plug inserted into said second rail;
at least one reinforcement member extending through an abutment of said two said first rail and said second rail and between said first plug and said second plug; and
adhesive at least substantially filling the longitudinal lumens in said first rail and said second rail between said first and second plugs.

* * * * *